(12) United States Patent
Klishko et al.

(10) Patent No.: US 7,817,145 B2
(45) Date of Patent: *Oct. 19, 2010

(54) METHOD AND SYSTEM FOR PERFORMING SCROLLING BY MOVEMENT OF A POINTING OBJECT IN A CURVILINEAR PATH ON A TOUCHPAD

(75) Inventors: Vadim Klishko, Layton, UT (US); Richard D. Woolley, Orem, UT (US); Michael D. Layton, Salt Lake City, UT (US)

(73) Assignee: Cirque Corporation, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,608

(22) Filed: Apr. 20, 2009

(65) Prior Publication Data

US 2009/0265658 A1    Oct. 22, 2009

Related U.S. Application Data

(60) Provisional application No. 61/046,079, filed on Apr. 18, 2008.

(51) Int. Cl.
*G06F 3/041* (2006.01)

(52) U.S. Cl. .................................. 345/173; 345/684

(58) Field of Classification Search ................. 345/157, 345/173–179, 684
See application file for complete search history.

(56) References Cited

U.S. PATENT DOCUMENTS

| | | | |
|---|---|---|---|
| 5,903,229 A | 5/1999 | Kishi | |
| 5,943,052 A | 8/1999 | Allen et al. | |
| 6,771,280 B2 | 8/2004 | Fujisaki et al. | |
| 7,564,449 B2 * | 7/2009 | Layton et al. | 345/173 |
| 2004/0252109 A1 * | 12/2004 | Trent et al. | 345/174 |
| 2005/0168443 A1 | 8/2005 | Ausbeck | |
| 2005/0168489 A1 | 8/2005 | Ausbeck, Jr. | |
| 2006/0290678 A1 | 12/2006 | Lii | |
| 2007/0013674 A1 | 1/2007 | Woolley | |
| 2007/0236475 A1 | 10/2007 | Wherry | |

\* cited by examiner

*Primary Examiner*—Ricardo L Osorio
(74) *Attorney, Agent, or Firm*—Morriss O'Bryant Compagni, P.C.

(57) ABSTRACT

A method of moving an object in a generally circular manner on the surface of a touchpad and causing a list to be scrolled as long as the object is moving, wherein a method is provided for activating a scrolling function, wherein a method is provided for determining what direction scrolling should occur based upon a direction of movement when scrolling is engaged, and wherein the direction of scrolling is only changed by an abrupt change in direction of the object.

9 Claims, 6 Drawing Sheets

METHOD AND SYSTEM FOR PERFORMING SCROLLING BY MOVEMENT OF A POINTING OBJECT IN A CURVILINEAR PATH ON A TOUCHPAD

BACKGROUND OF THE INVENTION

1. Field of the Invention

This invention relates generally to circular scrolling on a touchpad. More specifically, the present invention relates to moving an object in a generally circular manner on the surface of a touchpad and causing a list to be scrolled as long as the object is moving, wherein a method is provided for activating a scrolling function, wherein a method is provided for determining in what direction scrolling should occur, and wherein a method is provided for determining when the direction of scrolling should change.

2. Description of Related Art

Touchpads are being used in many portable electronic appliances and in stationary electronic devices to manipulate or access data. As touchpads are becoming ubiquitous as data entry and control interfaces, great effort is being expended on making touchpads easier and more intuitive to use. One common data manipulation paradigm is to use a touchpad to scroll through a list of items being shown on a display screen. One example of using a touchpad for scrolling is in a portable music player. The user can scroll through a list of songs or playlists of songs and make a selection. But the portable music player is only one example of a device using a touchpad. Other portable electronic appliances include many brands of MP3 players, portable video players, digital cameras and camcorders, mobile telephones, and many different portable entertainment devices. But even desktop devices such as desktop computers take advantage of scrolling methods that are quick and easy to activate and use.

One of the main problems that many portable electronic appliances have is that their size limits the number of ways in which communicating with the appliances is possible. One reason is the very limited amount of space that is available for a user interface. For example, mobile telephones that require a telephone keypad are now replacing many personal digital assistants (PDAs). Typically, PDAs require a keyboard for data entry. The inventors of the present invention were involved in the discovery and development of a touchpad that is disposed underneath a telephone keypad. Placing the keypad under a telephone keymat made the best possible use of the limited space available for data entry.

Other developers and users of portable electronic appliances have seen the benefits that come from using a circular touchpad. The very nature of a circular touchpad encourages continuous motion in two directions. However, a circular touchpad typically provides less functionality for other touchpad functions, such as cursor manipulation. Thus, it would be an advantage to provide improved scrolling functions on the typical rectangular touchpad shape.

Consider a personal digital assistant (PDA). A PDA often has to provide a full keyboard for the user in order to enter the characters of an alphabet. Even more difficult is the problem of having to deal with graphical interfaces. PDAs and even mobile telephones are becoming portable "computers" that do more than just store information or make telephone calls. Small portable electronic appliances now manipulate and process data, much like a notebook computer. Furthermore, graphical interfaces present some unique challenges when providing a user interface.

The difficulties described are not unique to PDAs and mobile telephones. Even less complex devices are providing more and more functionality. Consider again the MP3 audio player that enables a user to list songs, and then move through that list in order to select a song to play, move to a playlist, or examine different settings or features.

One feature of these portable electronic appliances that is common to all of those listed above and other appliances under development is the need to quickly and easily move or scroll through lists and make selections. It should be noted that all of the portable electronic appliances listed above have or will soon have touchpads disposed somewhere on or within them. This evolution is only natural considering the complex functions and graphical interfaces that they use. However, these portable electronic appliances presently lack a means for providing better activation and control of scrolling functions.

Thus, it would be an improvement over the prior art to provide a system and method for providing rapid and simple activation of the scrolling function. It would be a further improvement to provide control of the scrolling function in a mariner that is different from typical use of the touchpad in order to perform other functions, such as cursor control.

As background regarding touchpads, it is useful to understand one embodiment of touchpad technology that is used to implement the present invention. Accordingly, a brief explanation of touchpad technology from CIRQUE® Corporation is provided.

Figure 1:
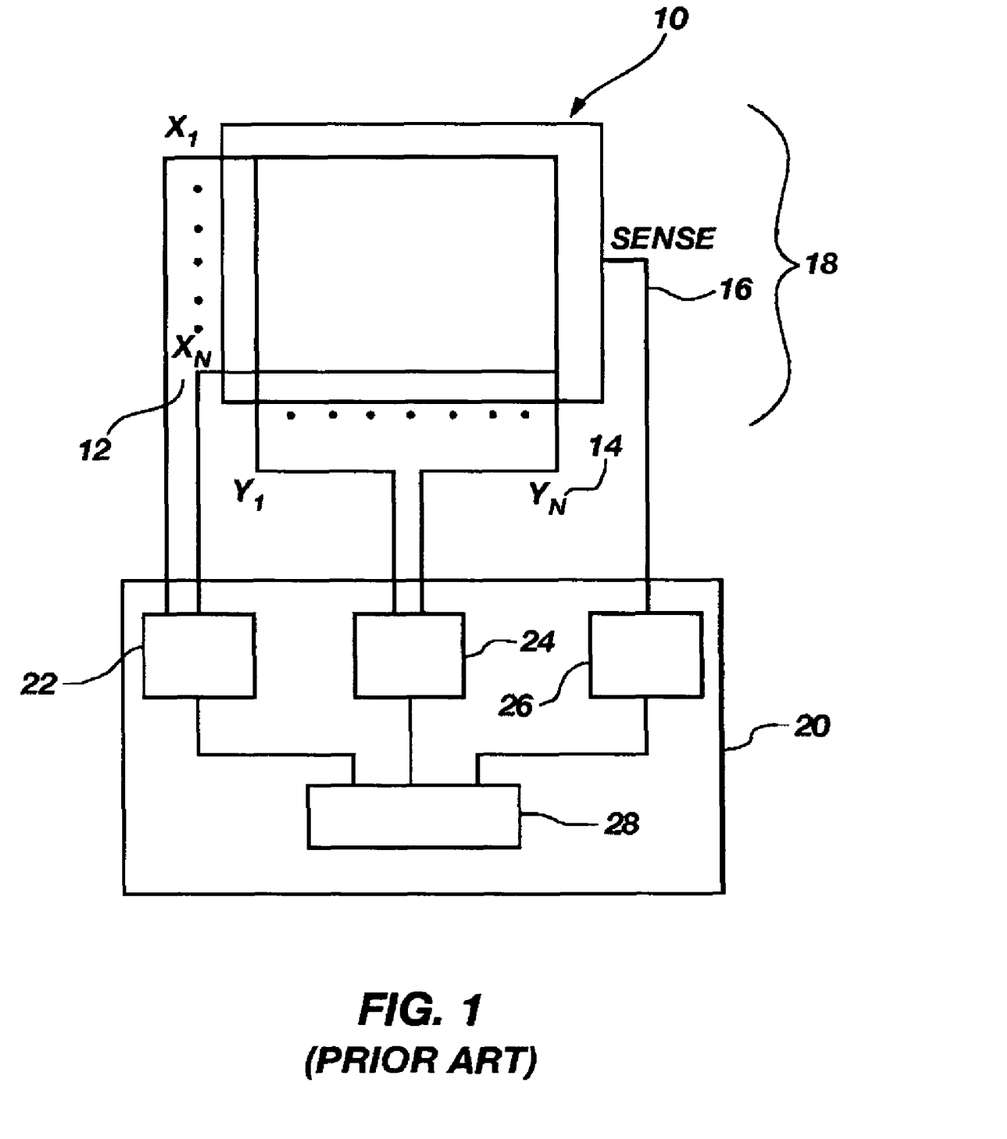
FIG. 1 is a schematic block diagram of a prior art touch sensor circuit and an electrode grid of a capacitance sensitive touchpad.

The touchpad technology from CIRQUE® Corporation is a mutual capacitance-sensing device and an example is illustrated in FIG. 1. In this touchpad, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode. All position measurements are made through the sense electrode.

In more detail, FIG. 1 shows a capacitance sensitive touchpad 10 as taught by Cirque® Corporation that includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. A touchpad sensor circuit 20 generates signals from P, N generators 22, 24 that are sent directly to the X and Y electrodes 12, 14 in various patterns. Accordingly, there is a one-to-one correspondence between the number of electrodes on the touchpad electrode grid, and the number of drive pins on the touch sensor circuitry 20.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touch sensor circuitry 20 is in a balanced state, and there is no signal on the sense line 16. There may or may not be a capacitive charge on the electrodes 12, 14. In the methodology of CIRQUE® Corporation, that is irrelevant. When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22, and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touch sensor circuit 20 is directly driving the electrodes 12, 14 of the touchpad 10. Thus, for a typical 12×16 electrode grid touchpad, there are a total of 28 pins (12+16=28) available from the touch sensor circuitry 20 that are used to drive the electrodes 12, 14 of the electrode grid.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the sense electrode can also be replaced by the X or Y electrodes by using multiplexing of signals and sensing functions. Either design will enable the present invention to function.

The present invention is not the first that has been developed to provide circular scrolling capability through use of a general purpose touchpad. Accordingly, it is also useful to examine these earlier attempts to provide circular scrolling capability.

First, it is noted that for the purposes of this document, circular scrolling is defined as the movement of a pointing object on the surface of a touchpad in a curvilinear manner. The curvilinear movements of the pointing object can include partial arcs, complete arcs (ellipses) and curved lines having arcs that curve in more than one direction (such as an "S" curve that has both clockwise (CW) and counter-clockwise (CCW) movement). Curvilinear paths will also be defined as including curved portions interrupted by substantially straight portions. The curvilinear paths can turn in a single direction (either CW or CCW) before stopping, or the paths can either gradually or abruptly change to an opposite direction.

Figure 2:
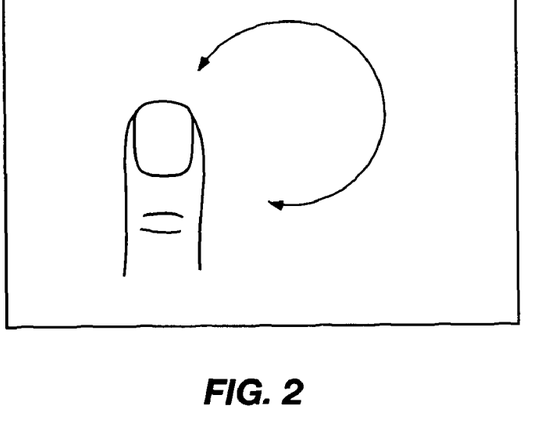
FIG. 2 is an illustration of a prior art method of circular scrolling as taught in the prior art.

A first prior art reference that should be considered was issued to Kishi as U.S. Pat. No. 5,903,229 (the '229 patent). The '229 patent teaches determining if a path that is traced by a pointing object on the surface of a touchpad is CW or CCW and is illustrated in FIG. 2. If the path is CW, then scrolling always occurs in one direction. If the path is CCW, then scrolling always occurs in an opposite direction.

To determine whether a path is CW or CCW, the '229 patent teaches the use of a "rotation direction detector" to determine the gradient or the slope of two adjacent segments along a curvilinear path being traced on a touchpad surface. The '229 patent teaches this gradient method on the belief that it is simpler than performing a "more complicated" angular calculation, and therefore that gradient calculations reduce calculation overhead on a processor so that the device can operate in real-time.

Interestingly, the amount of scrolling to be performed is never claimed or explained. It must be assumed that the amount of scrolling is a function of distance traveled by the pointing object on the touchpad surface as no method is described.

One important element of the '229 patent is that the direction of scrolling is static. In other words, scrolling in a CW manner will always cause scrolling to occur in one direction only, such as down in a list, and this down direction will always be associated with CW scrolling.

Another prior art that should also be considered is U.S. Pat. No. 6,771,280 B2 issued to Fujisaki et al. (the '280 patent). The '280 patent teaches that entering the scroll mode is provided through key-input or tapping action.

Figure 3:
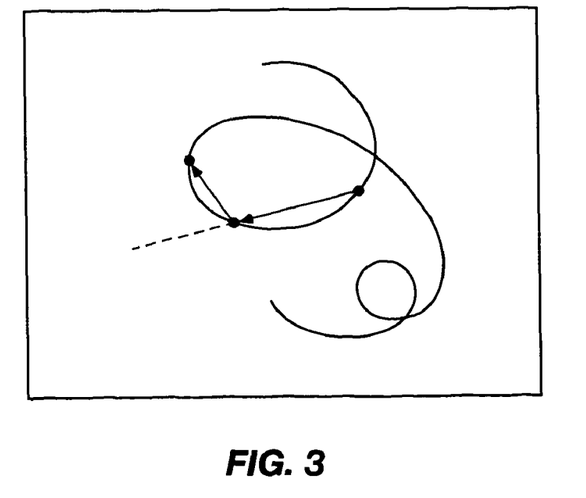
FIG. 3 is an illustration of a different prior art method of circular scrolling as taught in the prior art.

Once the scrolling mode is engaged, scrolling information is obtained from two consecutive vectors as shown in FIG. 3. The angle between a first vector and a second vector determines the direction of scrolling. The amount of scrolling is a function of the magnitude of the second vector. It is noted that each second vector becomes a first vector as a new second vector is added as the pointing object moves along a touchpad surface. Note that the length of the second vector is close to but actually almost always less than the actual distance moved. The only time that the second vector is the same length as the actual distance traveled is when the pointing object is moving in a perfectly straight line. Accordingly, if a finger were to move in a perfectly straight line, there would be no angle between a first and second vector. This should mean that there would be no scrolling. However, as perfectly linear movement is as a matter of practicality impossible, a list might jump around erratically without any means provided to smooth out this reaction.

In summary, the '280 patent teaches that the direction of scrolling is either CW or CCW depending on the angle between two vectors. This is identical to the method of the '229 patent in that a particular direction of rotation is always associated with one particular direction of scrolling. The amount of scrolling is a function of the length of the second vector, which might be slightly shorter than actual distance moved. This method is therefore almost identical to the '229 patent.

The '229 patent and the '280 patent are both identical in that circular movement of a pointing object in a particular direction will always result in scrolling through a list in a particular direction, and that changing a direction of rotation will result in reversal of the direction of movement of scrolling through a list. While the '229 patent does not explicitly explain, it can be assumed that the two patents are also similar in that the amount of scrolling in the '229 patent is probably a function of the distance moved as is stated in '280 patent. It would be an improvement over the state of the art in circular scrolling to provide a new method wherein circular movement in a particular direction did not result in scrolling in a single fixed direction. It would also be an improvement to enable any continuous movement to result in continued scrolling through a list, even when CW movements are combined with CCW movements.

BRIEF SUMMARY OF THE INVENTION

In a first embodiment, the present invention is a method of moving an object in a generally circular manner on the surface of a touchpad and causing a list to be scrolled as long as the object is moving, wherein a method is provided for activating a scrolling function, wherein a method is provided for determining in what direction scrolling should occur based upon a direction of movement when scrolling is engaged, and wherein the direction of scrolling is only changed by an abrupt change in direction of the object.

In a first aspect of the invention, a scrolling mode is engaged by touchdown and movement of a finger in a linear scrolling region, and then moving out of the linear scrolling region into a general purpose area of the touchpad to move along a curvilinear path in order to continue scrolling through a list.

In a second aspect of the invention, circular movement in a particular direction can be associated with scrolling in either direction through a list.

In a third aspect of the invention, the initial direction of scrolling is a function of the initial direction of movement of a pointing object in a linear scrolling region.

In a fourth aspect of the invention, a scrolling mode is engaged by touchdown in a non-linear scrolling engagement region, followed by circular movement to cause scrolling to occur.

In a fifth aspect of the invention, a change in scrolling direction only occurs when there is an abrupt change in direction of movement by the pointing object. Thus movement of the pointing object in a "figure 8" motion will not cause a scrolling direction to change.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

Figure 4:
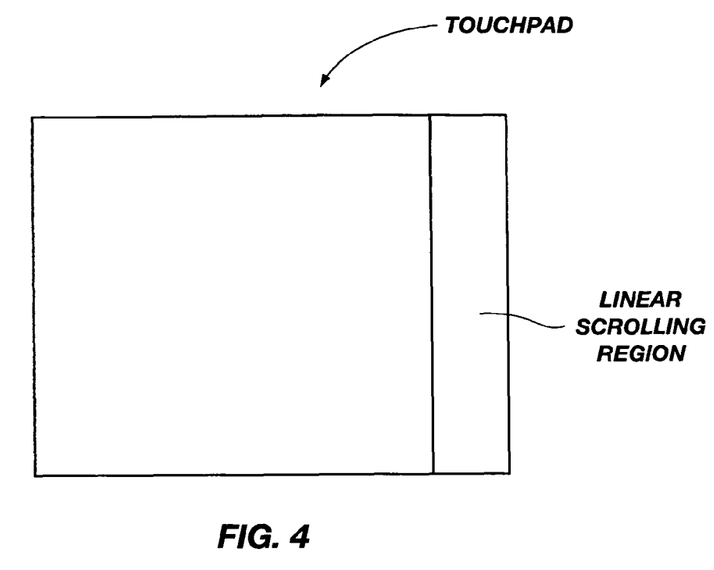
FIG. 4 is an illustration of a first embodiment of the present invention using a dedicated linear scrolling region for activating a scrolling mode and determining initial direction of scrolling.

A first embodiment of the present invention is illustrated in FIG. 4. FIG. 4 is a view looking down on a touchpad from above, wherein a dedicated linear scrolling region is provided. The linear scrolling region can be disposed along the top, the bottom, the left or the right edges of the touchpad. There can even be more than one linear scrolling region. For example, one linear scrolling region can be dedicated to scrolling vertically, and another for scrolling horizontally. For this example, a single linear scrolling region is shown as being on a right edge of the touchpad.

In this first embodiment, a pointing object makes touchdown anywhere within the linear scrolling region of the touchpad. The pointing object can be a conductive object or an object having a high degree of permittivity. If conductive, the pointing object may be a finger or a stylus.

Touchdown of the pointing object within the linear scrolling region activates a scrolling mode. The direction of scrolling through some list being shown on a display screen is then determined by movement of the pointing object. Intuitively, movement toward the top of the touchpad will likely cause scrolling in an upward direction through the list, and movement toward the bottom of the touchpad will therefore cause scrolling in a downward direction through the list. The direction of scrolling is programmable.

Once scrolling has been activated and the direction of scrolling has been determined by subsequent movement within one of the two directions available in the linear scrolling region, the pointing object is now free to move out of the linear scrolling region into the general purpose area of the touchpad, while still continuing the scrolling operation. Movement from the linear scrolling region into the general purpose area of the touchpad can be made at any angle. In other words, there is no limitation on what direction the pointing object must travel when passing from the linear scrolling region and into the general purpose area.

One aspect of this embodiment regarding movement is that all curvilinear movement of the pointing object will result in scrolling. In contrast, all generally linear movement of the pointing object will not result in a scrolling action. Thus, as long as the pointing object moves in curvilinear paths, scrolling will occur. This means that scrolling action can be interrupted if the pointing object stops curvilinear movement and begins generally linear movement. However, subsequent curvilinear movement will re-engage the scrolling action. The pointing object is also free to stop all movement. Scrolling action will also stop at this time. However, as long as the pointing object is not removed from the surface of the touchpad, the scrolling mode will not be disengaged. Subsequent curvilinear movement will again result in scrolling action.

When scrolling, the present invention provides an algorithm for determining a rate of scrolling. The rate of scrolling is a function of the velocity of the pointing object. More specifically, the scrolling rate is a function of the transverse velocity. The transverse velocity is the component of velocity perpendicular to the path of the pointing object. The velocity vector can be uniquely written as a sum $v=v_{tangential}+v_{normal}$, where $v_{normal}$ is the transverse component.

The speed of scrolling is a function of the distance moved of the pointing object on the touchpad. Thus, rapid curvilinear movement of the pointing object will result in more rapid scrolling simply because a large distance is being traveled, and slower curvilinear movement will therefore result in slower scrolling because less distance is being traveled.

Figure 5A:
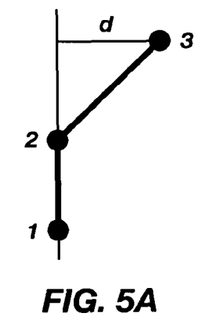
FIGS. 5A, 5B and 5C illustrate the vectors that are used to determine an amount of scrolling to be performed.

The rate of scrolling is calculated based on three consecutive measurements of finger coordinates. FIG. 5A shows three points marked 1, 2, and 3. The scroll amount is determined by the distance (d) from the new point (3) to the line containing the two previous points (1 and 2).

Figure 5B:
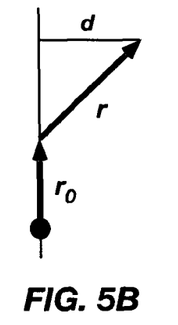
Figure 5C:
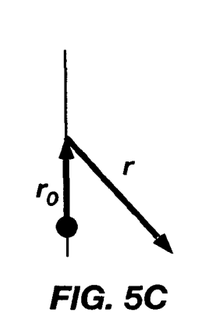

The three consecutive finger positions give two consecutive finger displacement vectors, $r_0$ and $r$ shown in FIGS. 5B and 5C. In terms of these vectors, the distance (d) can be calculated by the formula:

$$d=|r_0 \times r|/|r_0|$$

The scrolling amount is proportional to (d) at high values of $|r|$. At low values of $|r|$, the scroll amount is a constant non-zero value if $|r_0 \times r| \neq 0$ or zero if $|r_0 \times r|=0$.

It has been stated that generally linear movement will not result in scrolling in the present invention. FIG. 5A illustrates this concept by showing that when moving in a substantially straight line, the value (d) is nearly zero. It may be the case that because it is impossible to move in a perfectly line, scrolling may be susceptible to a problem. The problem is that depending on the sensitivity of the system, moving in a straight line may result in a "bouncing" or "jittery" action in the list.

This problem does not appear to be addressed in the prior art. Accordingly, the present invention proposes the following solution. The problem is solved where the sensitivity of the system is made to be adjustable. Sensitivity can therefore be increased or decreased by making it a function of the size of the value (d).

Figure 6A:
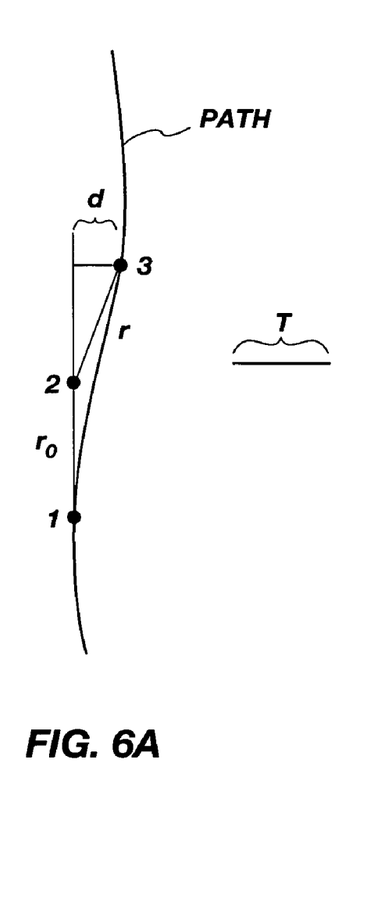
FIG. 6A is a path of a pointing object that does not result in scrolling action because the value (d) is smaller than a threshold value T.

For example, assume that sensitivity is made a certain value and therefore the threshold value T is made the length as shown in FIG. 6A. Consider a curvilinear path as shown in FIG. 6A. If the threshold value is shown as T, and the vectors $r_0$ and $r$ are as shown, the value of (d) is less than the threshold value T. Thus, this movement is considered to be in a substantially straight line and will not cause any scrolling.

Figure 6B:
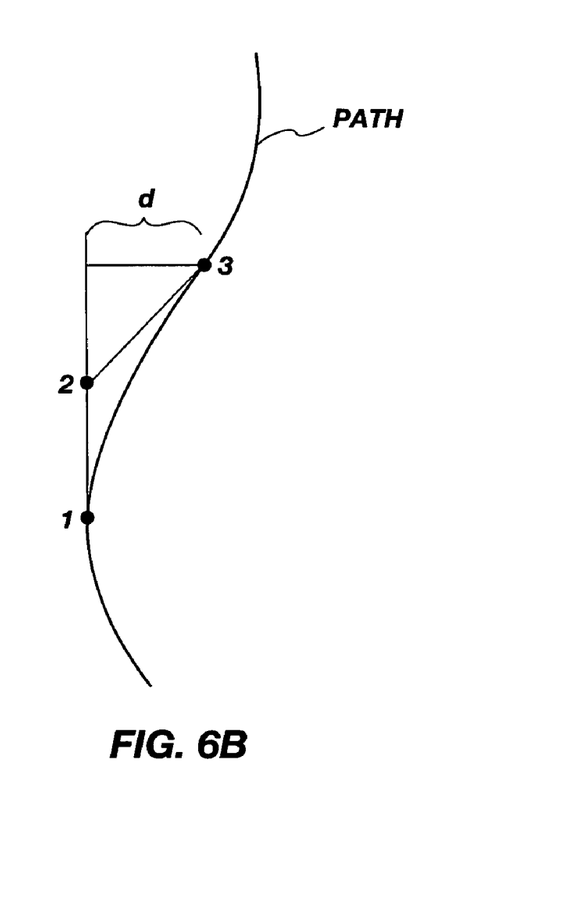
FIG. 6B is a path of a pointing object that does result in scrolling action because the value (d) is greater than a threshold value T.

Now consider the curvilinear path shown in FIG. 6B. If the threshold value is shown as T, and the vectors $r_0$ and $r$ are as shown, the value of (d) is greater than the threshold value T. Thus, this movement is considered to be in a substantially curvilinear path and will cause scrolling to occur.

Another way to express the sensitivity is to describe sensitivity in terms of curvilinear movement. A distinct or clearly curvilinear movement will result in a value of (d) that is greater than some threshold value T. Thus curvilinear movement that results in a value of (d) that is greater than the threshold value T will result in scrolling action. Sensitivity is increased by decreasing the length of the threshold value T, and sensitivity is decreased by increasing the length of the threshold value T. Thus, sensitivity is inversely proportional to the length of the threshold value T.

Figure 7:
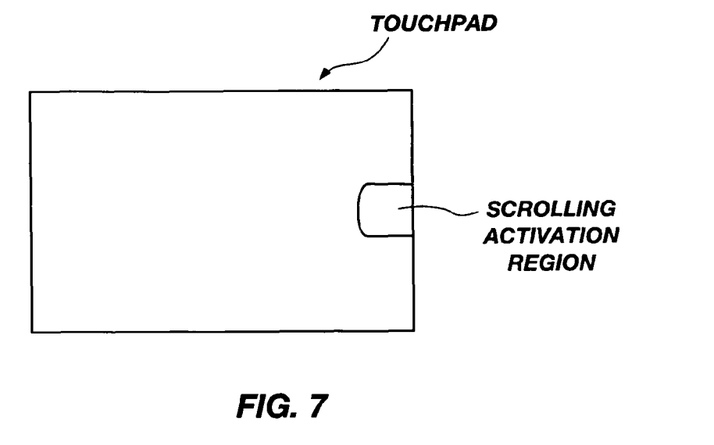
FIG. 7 is an illustration of a second embodiment of the present invention using a non-linear scrolling region for scrolling activation.

In a second embodiment of the present invention, a scrolling mode is engaged by touchdown of the pointing object in a non-linear scrolling region. FIG. 7 shows that a region of the touchpad has been designated as a scrolling activation region. This region is shown as being midway between the top edge and the bottom edge of the touchpad and disposed along the right edge. In this embodiment, the position of the scrolling activation region should simply be one in which subsequent movement outside of the scrolling activation region will determine the direction of scrolling. By positioning the scrolling activation region generally at a midpoint between the top and the bottom edges, there is sufficient to move the pointing object towards the top edge or the bottom edge, and thereby enable scrolling up or down in a list.

The scrolling activation region could also be disposed against the left edge of the touchpad as well. These two positions enable the direction of scrolling to correspond intuitively to up and down scrolling actions. Likewise, the scrolling activation region could also be disposed midway between the left and right edges and on the top edge or the bottom edge of the touchpad, enabling movement of the pointing object in a left or right direction to determine a scrolling direction. While initial movement directions out of the scrolling activation region can be made to correspond to actual scrolling directions, it is not required. Thus, movement in a left or right direction out of a scrolling region disposed on the top or bottom edge can also cause corresponding up and down scrolling actions.

In another embodiment the scrolling region is assigned a specific scrolling direction. Therefore, touchdown in the scrolling region results not only in activation of the scrolling mode, but any subsequent movement in any direction will cause scrolling to occur in the initial scrolling direction assigned to the scrolling region. Accordingly, there will likely be at least two scrolling regions, one dedicated to an initial scrolling direction that is down, and another dedicated to an initial scrolling direction that is up.

The scrolling activation region can be disposed anywhere on the touchpad, and is not limited to the examples given. Furthermore, it is an aspect of the present invention that there is no scrolling activation region. Scrolling may be activated by some other action or by a button that is not located on the touchpad. If the scrolling mode is activated by some other means than touchdown on the touchpad, then subsequent touchdown and movement of the pointing object will also result in a scrolling action. The scrolling mode will likely be disengaged by Lifting the pointing object off of the touchpad.

Both the first and the second embodiments described above utilize different methods for activating scrolling and for determining an initial direction for the scrolling action. But once scrolling is engaged, the present invention also provides a means for changing a direction of scrolling. The prior art was shown to teach a static assignment of scrolling direction, wherein a specific circular movement always corresponds to a particular direction of scrolling. In contrast, the present invention uses only one method for changing a scrolling direction.

Figure 8:
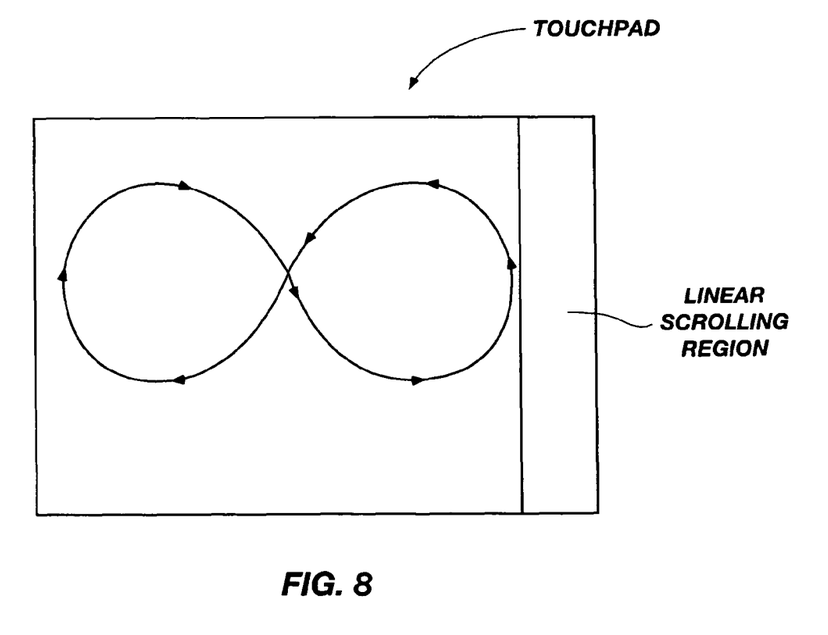
FIG. 8 is an illustration of a touchpad showing a curvilinear path being followed by a pointing object, wherein the path forms a "figure 8".

FIG. 8 is an illustration of a touchpad showing a curvilinear path being followed by a pointing object. Specifically, the curvilinear path forms a "figure 8". In the present invention, tracing the curvilinear path of the "figure 8" will not cause any change is scrolling direction. The "figure 8" curvilinear path causes a pointing object to change back and forth between a CW and a CCW direction of movement. The prior art teaches that this would cause the scrolling direction to repeatedly switch. In contrast, the present invention teaches that as long as the curvilinear path is continuous and does not cause include any actions that will change the direction, scrolling will continue uninterrupted in a single direction.

Figure 9:
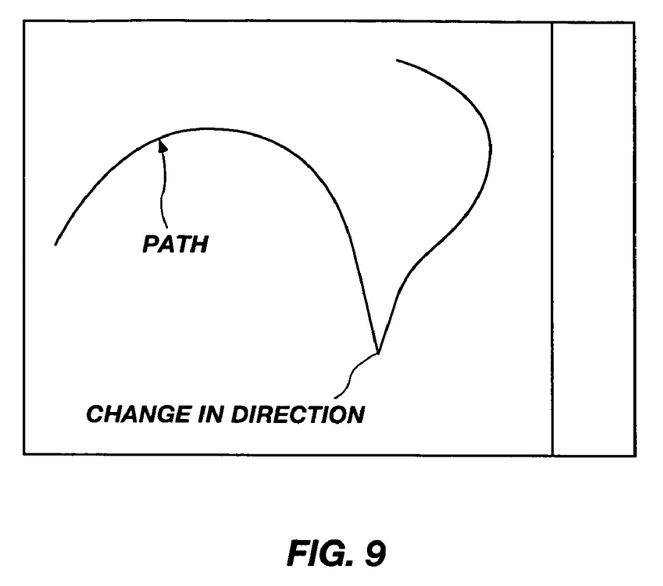
FIG. 9 illustrates a new curvilinear path that includes an abrupt reversal of direction of the pointing object.

To change the direction of scrolling, FIG. 9 illustrates a new curvilinear path that includes an abrupt reversal of direction of the pointing object. The abrupt change in direction can be assigned a specific degree of change. For example, any change in direction that is greater than 150 degrees could be assigned the meaning that a change in scrolling direction is desired. What is important is that the degree of change required should be sufficiently large so that the meaning of the change is not ambiguous. Accordingly, the degree of change may be made greater or less than 150 degrees, depending on the design of the touchpad.

Figure 10:
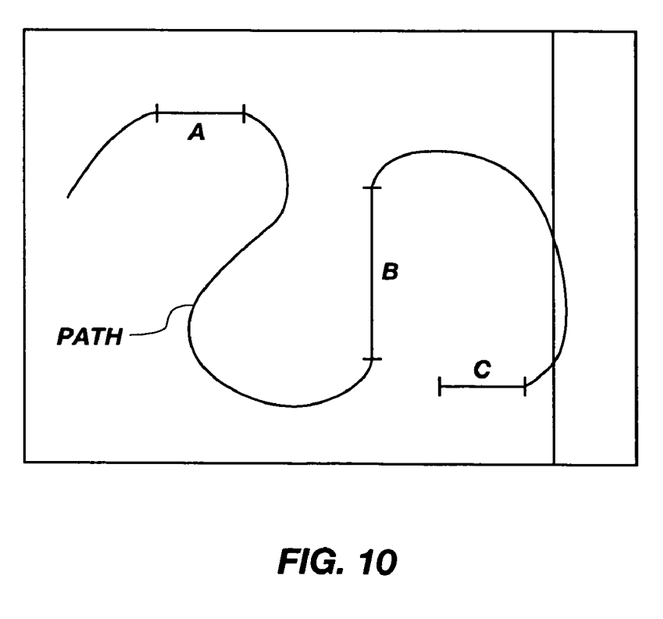
FIG. 10 is an illustration of a path of movement that includes portions that are substantially curvilinear and segments of the path that are substantially linear.

FIG. 10 is provided as an illustration of a possible path of movement of the pointing object on the touchpad. This path of movement includes portions that are sufficiently curvilinear so that they are interpreted as causing scrolling action. However, there are also segments of the path that illustrate portions that are sufficiently linear so that they are interpreted as causing no scrolling action. It should be understood that the sensitivity of the touchpad to linear and curvilinear movements is an adjustable value.

It should be understood that scrolling action is not the only action that can be controlled by movement of a pointing object in two dimensions on the touchpad. Any value can be incremented or decremented by movement on the touchpad surface. Thus, any value that must be entered or changed can be easily controlled using the present invention.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for scrolling using a touchpad for interface control, said method comprising the steps of:
   1) providing a touchpad including a linear scrolling region and a general purpose area of operation;
   2) touching down with a pointing object in the linear scrolling region to engage a scrolling mode;
   3) moving the pointing object in an initial direction of scrolling to thereby begin a scrolling action;
   4) moving the pointing object from the linear scrolling region to the general purpose area, wherein the scrolling action continues in the initial direction;
   5) moving the pointing object along a curvilinear path to continue the scrolling action in the initial direction; and
   6) keeping the pointing object disposed on the touchpad as long as the scrolling action is desired, and removing the pointing object to disengage the scrolling mode.

2. The method as defined in claim 1 wherein the method further comprises the step of enabling a change in direction of scrolling only upon an abrupt change of direction of movement of the pointing object that is at least greater than 150 degrees.

3. The method as defined in claim 1 wherein the method further comprises the step of not allowing a change in direction of scrolling when the curvilinear path changes between clockwise (CW) and counter-clockwise (CCW) movements.

4. The method as defined in claim 1 wherein the method further comprises the step of enabling the initial direction of scrolling to be in a list that scrolls vertically or horizontally.

5. The method as defined in claim 4 wherein the method further comprises the step of providing the linear scrolling region along a left or right edge of the touchpad.

6. The method as defined in claim 4 wherein the method further comprises the step of providing the linear scrolling region along a top or bottom edge of the touchpad.

7. A method for scrolling using a touchpad for interface control, said method comprising the steps of:
   1) providing a touchpad including a scrolling activation region and a general purpose area of operation;
   2) touching down with a pointing object in the scrolling activation region to engage a scrolling mode;
   3) moving the pointing object out of the scrolling activation region and into the general purpose area to thereby perform a scrolling action in an initial direction of scrolling;
   4) moving the pointing object along a curvilinear path for the scrolling action to continue; and
   5) keeping the pointing object disposed on the touchpad as long as the scrolling action is desired, and removing the pointing object to disengage the scrolling mode.

8. The method as defined in claim 7 wherein the method further comprises the step of enabling a change in direction of scrolling only upon an abrupt change of direction of movement of the pointing object that is at least greater than 150 degrees.

9. The method as defined in claim 7 wherein the method further comprises the step of not allowing a change in direction of scrolling when the curvilinear path changes between clockwise (CW) and counter-clockwise (CCW) movements.

* * * * *